(12) United States Patent
Cartagena et al.

(10) Patent No.: US 12,254,443 B1
(45) Date of Patent: Mar. 18, 2025

(54) ROBOTIC ITEM RECOVERY

(71) Applicant: Amazon Technologies, Inc., Seattle, WA (US)

(72) Inventors: Gregory Cartagena, Boston, MA (US); Gabriel Hebert, Wakefield, MA (US); Caroline Anne Keely, Wakefield, MA (US); Jonathan Lee Zerez, Honolulu, HI (US)

(73) Assignee: Amazon Technologies, Inc., Seattle, WA (US)

( * ) Notice: Subject to any disclaimer, the term of this patent is extended or adjusted under 35 U.S.C. 154(b) by 856 days.

(21) Appl. No.: 17/112,356

(22) Filed: Dec. 4, 2020

(51) Int. Cl.
| | | |
|---|---|---|
| G06Q 10/087 | (2023.01) | |
| B25J 9/16 | (2006.01) | |
| B25J 15/06 | (2006.01) | |
| B25J 19/00 | (2006.01) | |
| B25J 19/02 | (2006.01) | |
| B65G 1/137 | (2006.01) | |
| G01C 21/20 | (2006.01) | |
| G05D 1/00 | (2024.01) | |

(52) U.S. Cl.
CPC ........... *G06Q 10/087* (2013.01); *B25J 9/162* (2013.01); *B65G 1/137* (2013.01); *G01C 21/206* (2013.01); *G05D 1/0297* (2013.01); *B25J 15/0616* (2013.01); *B25J 19/005* (2013.01); *B25J 19/02* (2013.01); *G05D 1/0088* (2013.01)

(58) Field of Classification Search
CPC ......... G06Q 10/087; B25J 9/162; B25J 19/02; B65G 1/137; G01C 21/206; G05D 1/0297; G05D 1/0088; G05D 2201/0216
See application file for complete search history.

(56) References Cited

U.S. PATENT DOCUMENTS

| | | | | |
|---|---|---|---|---|
| 9,682,483 | B1* | 6/2017 | Romano | B25J 11/0085 |
| 9,827,677 | B1* | 11/2017 | Gilbertson | A47L 11/24 |
| 10,071,893 | B2* | 9/2018 | High | G01S 1/7034 |
| 11,673,742 | B2* | 6/2023 | Wagner | B65G 1/0492 |
| | | | | 414/279 |
| 2016/0129592 | A1* | 5/2016 | Saboo | B25J 5/007 |
| | | | | 700/248 |
| 2020/0180861 | A1* | 6/2020 | Fürstenberg | B65G 1/0492 |

* cited by examiner

*Primary Examiner* — Ig T An
(74) *Attorney, Agent, or Firm* — Lee & Hayes, P.C.

(57) ABSTRACT

Embodiments describe techniques for controlling picking robots to retrieve items on the floor and return them to an appropriate location. In one embodiment, the picking robots wait until a sensor in a monitored area (e.g., a designated robot area or an area around a pick/stow station) detects a dropped item on the floor. A central control system then dispatches the picking robot to the location to retrieve the dropped item. In another embodiment, when not being dispatched, the picking robots patrol the area looking for dropped items.

20 Claims, 6 Drawing Sheets

ROBOTIC ITEM RECOVERY

BACKGROUND

The present invention relates to retrieving dropped items using a picking robot, and more specifically, to a sensor system that detects dropped items and dispatches the picking robot.

Modern inventory systems, such as those in mail order warehouses, supply chain distribution centers, airport luggage systems, and custom-order manufacturing facilities, include a number of complex systems, including robots, automated shelving systems, radio frequency identification (RFID), and automated scheduling and routing equipment. Many systems, for example, comprise robots that travel to shelving systems to retrieve items, or the shelves themselves, and return them to a central location for additional processing.

Automated warehouses exist that use robots, for example, to move items or shelves from a storage location in the warehouse to a shipping location (e.g., for inventory items to be boxed and shipped). It is inevitable, however, that some items in the inventory system, trash, and other items will be dropped, misplaced, or otherwise mishandled during normal operations. In addition, merchandise can be damaged or destroyed when impacted or run over by the warehouse robots. Accurate inventories are also important to control costs, maintain inventory levels, and meet customer demand, among other things.

DETAILED DESCRIPTION

Embodiments describe techniques for controlling picking robots for use in the warehouse to retrieve items on the warehouse floor and return them to an appropriate location. In one embodiment, the picking robots wait until a sensor in a monitored area (e.g., a designated robot area or an area around a pick/stow station) detects a dropped item on the floor. A central control system then dispatches the picking robot to the location to retrieve the dropped item. In another embodiment, when not being dispatched, the picking robots patrol the area looking for dropped items. For example, the picking robots may have specialized sensors for detecting dropped items—e.g., thin, flat items or highly-reflective items—that may not be readily detectable to other types of sensors. The patrol routes may be concentrated in regions which historical data indicates are most likely to contain dropped items such as main paths or pick/stow stations.

In one embodiment, the picking robot uses a vacuum end effector to retrieve the dropped items. However, operating these types of end effectors on a mobile picking robot is difficult since they typically require high power (e.g., large currents). Instead of using a larger or high amperage battery, in one embodiment, the picking robot can operate in a low power mode where it operates an air compressor that is part of its vacuum system only if the picking robot is not performing a high power action (e.g., when the picking robot is stationary or not operating a robotic arm). This enables a lower amperage battery to be used which can reduce the weight and cost of the robot.

Figure 1:
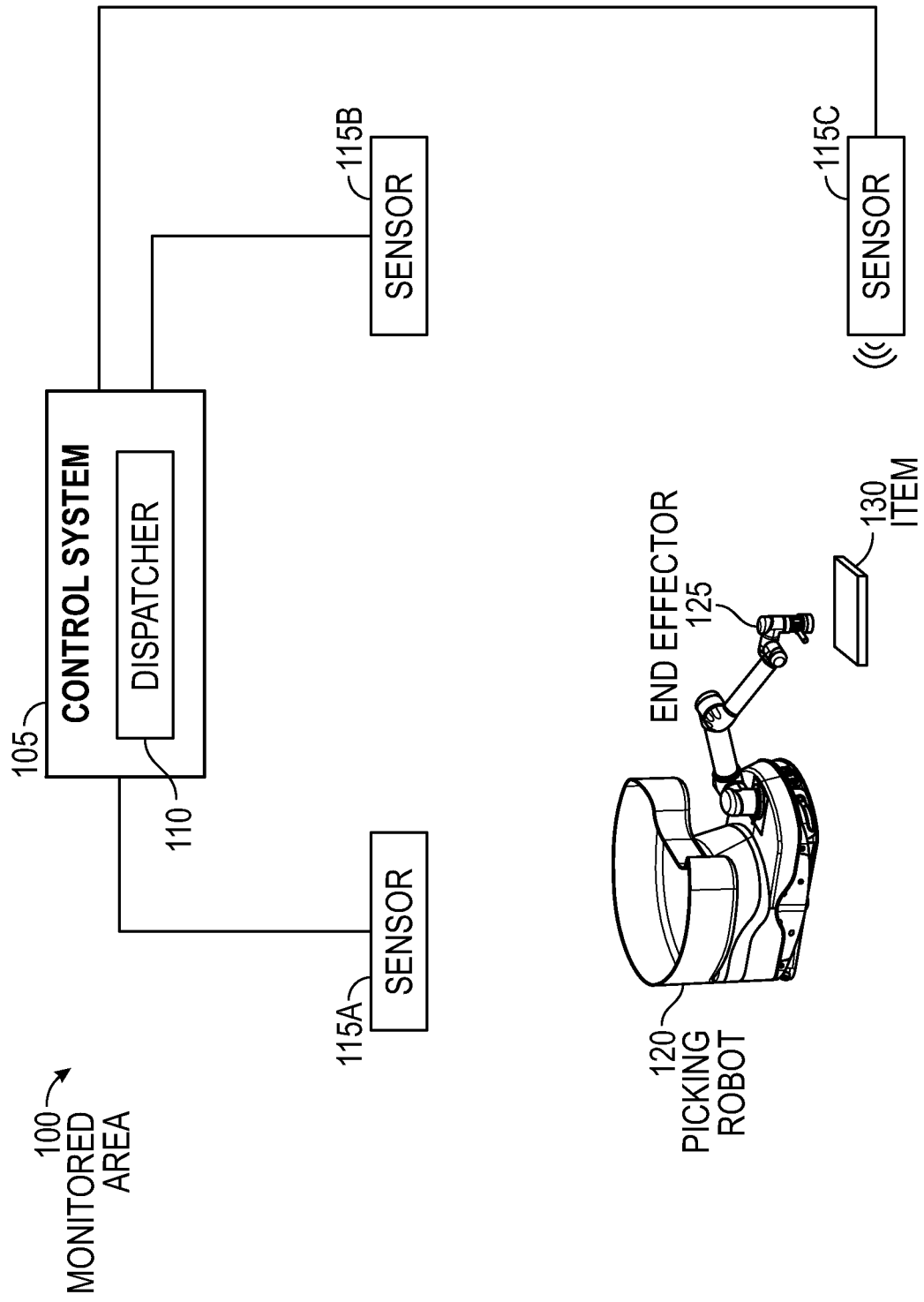
FIG. 1 illustrates monitoring an area using sensors to detect dropped items, according to one embodiment described herein.

FIG. 1 illustrates monitoring an area 100 using sensors 115 to detect dropped items (e.g., item 130), according to one embodiment described herein. To detect dropped items, a control system 105 (e.g., a centralized control system) is communicatively coupled to sensors 115 distributed in the area 100. In one embodiment, the sensors 115 may be the sensors used by a fleet of warehouse robots (not shown) when moving items in the area 100. For example, the warehouse robots may be tasked with moving items either by carrying the items directly (e.g., in a receptacle in the robots) or indirectly by carrying a container or structure that holds the items, such as a tote or a pod that includes a frame that supports multiple containers. When navigating the area 100, the sensors on the warehouse robots may detect a dropped item and report its location to the control system 105.

In another embodiment, the sensors 115 are stationary and are distributed throughout the area 100. For example, the area 100 may be a theme park or grocery store where the sensors 115 are disposed at various locations on the floor, ground, or in a ceiling to detect a dropped item (e.g., an item that was knocked off a shelf, a piece of litter, or misplaced and forgotten items). In another embodiment, the control system 105 may rely on a combination of stationary and mobile sensors 115 to detect dropped items in the monitored area 100.

The sensors 115 can be any type of sensor that generates data useful for detecting items on the floor or ground. Example sensors 115 can be cameras, LIDAR, time of flight sensors, and the like. If the sensors 115 are integrated into a robot, the robot may have logic for processing the data and determining whether there is a dropped item 130 in its vicinity. The robot can then inform the control system 105. If the sensors 115 are stationary, the sensor 115 may provide the sensor data to the control system 105 which processes that data to determine whether there is a dropped item 130.

The control system 105 represents any number of computing systems that can each include at least one processor and memory. In one embodiment, the control system 105 may be implemented in a data center or other cloud computing environment. In FIG. 1, the control system 105 includes a dispatcher 110 (e.g., a software application) that communicates with the sensors 115, identifies a location of the dropped item 130 using the received sensor data, and dispatches a picking robot 120 to retrieve the item 130. In FIG. 1, the sensor 115C has identified the item 130 and reported its location to the dispatcher 110 which then instructs the picking robot 120 to retrieve the item.

The picking robot 120 can be an autonomous robotic vehicle, or can be driven partially or fully by a human technician. For example, the picking robot 120 may be able to navigate the area 100 to move to the location of the item 130, retrieve the item 130 using an end effector 125, and return the item to a designated area without human intervention. In one embodiment, an autonomous robotic vehicle is a vehicle that operates without human intervention in a structured area that includes fiducials arranged in a grid or pattern which are detected by sensors on the robot, or an unstructured field that does not contain fiducials. Alternatively, the picking robot 120 may instead have cameras that enable the technician to drive the robot to the location, control the end effector 125 to retrieve the item 130, and then drive the robot to a designated area so the technician can retrieve the item 130 from the robot 120. In another example, some of the functions of the picking robot 120 are performed autonomously, such as navigating the robot 120 though the monitor area 100 to the location of the item 130, while other functions are performed by the technician such as operating the end effector 125 to retrieve the item 130. For example, the picking robot 120 may have several end effectors (e.g., a vacuum, scoop, grabber, etc.) which are useful for retrieving different types of dropped items. A human technician can determine which end effector is best for retrieving the item and then control the robot 120 to pick up the item 130. The picking robot 120 can then use its autonomous navigation functions to maneuver through the area 100 to return the item to a designated location. Thus, using the picking robot 120 means the technician does not have to enter the area 100 to retrieve the dropped item 130. This is especially useful if the area 100 is a designated robot area where having the technician enter can disrupt operations. Further, if the picking robot 120 is fully autonomous, the system in FIG. 1 can detect and retrieve dropped items without human intervention.

Figure 2:
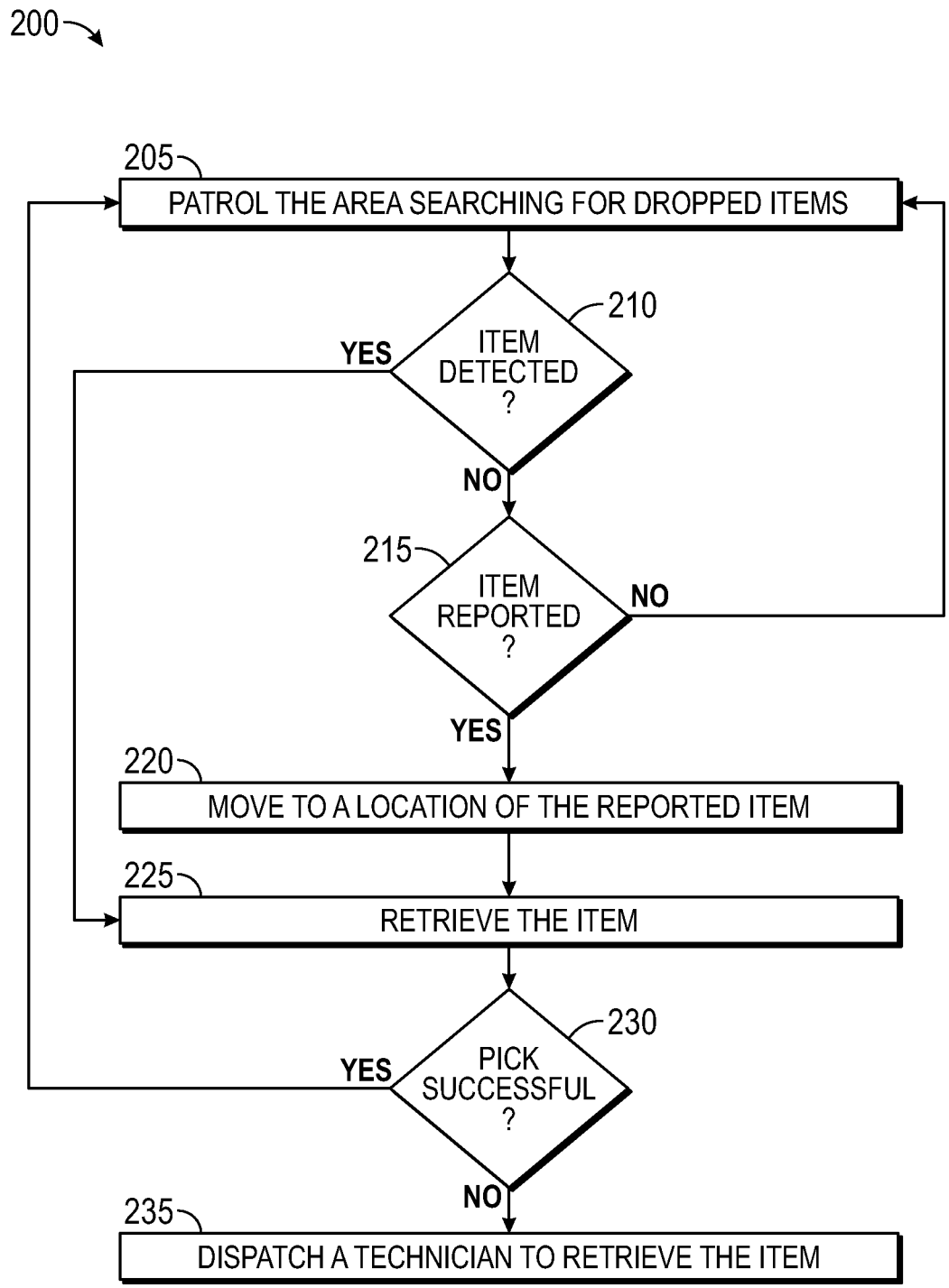
FIG. 2 is a flowchart for retrieving dropped items using a picking robot, according to one embodiment described herein.

FIG. 2 is a flowchart of a method 200 for retrieving dropped items using a picking robot, according to one embodiment described herein. At block 205, the picking robot patrols the monitored area, searching for dropped items. That is, while in some embodiments the picking robot can remain stationary and wait for the control system to dispatch it to pick up a reported item, in the method 200, the picking robot patrols the monitored area to identify and retrieve items it detects. For example, the picking robot may have sensors that are specially designed to detect dropped items. These sensors may be better at detecting dropped items relative to, e.g., the sensors on the warehouse robots that are tasked with moving the items to different locations. Put differently, using the picking robots to patrol the monitored area may mean the system can detect more dropped items relative to a system that relies solely on the sensors on other robots (i.e., robots not tasked with retrieving dropped items) to detect a dropped item.

In one embodiment, the picking robot can use a predefined route to patrol the monitored area. This route may be synchronized with routes followed by other picking robots so they monitor different regions in the monitored area. For example, one picking robots may patrol the left side of a warehouse while another robot patrols the right side.

In one embodiment, the route used by a patrolling picking robot is set using historical data indicating where previous dropped items were detected. For example, each time a new dropped item is detected by the sensors (e.g., sensor 115) or a picking robot, the dispatcher can store the location of the dropped item in the historical data. The dispatcher can then evaluate the historical data to determine whether there are regions in the monitored area where it is more likely for there to a be a dropped item. For example, the historical data may indicate that in a warehouse where robots are tasked with moving items, most of the dropped items occur in "highways" where the robots are moving faster, and at pick/stow stations where the robots bring the items so that an associate can retrieve an item from a container being carried by the robot, or stow an item in the container. In contrast, the historical data may indicate that dropped items rarely occur along aisles where the robots are moving slower or near charging stations where the robots are not typically carrying items.

The dispatcher can design routes that emphasize the regions in the monitored area where the historical data indicates there is a greater likelihood of dropped items. For example, the route may cause a patrolling picking robot to move through the highways and around the pick/stow stations, while only occasionally moving through the smaller aisles and near charging stations. Route planning using historical data may also be useful in other environments besides a warehouse. For example, in a grocery store, historical data may indicate that most dropped items occur where the selves have smaller items such as cans or candy, or at checkout regions where customers move items out of a shopping cart to be scanned. The dispatcher may focus the routes of the picking robots to focus on these regions and spend less time patrolling regions in the store that have larger items. In this manner, the picking robots may be able to identify reported items quicker than if the patrol routes were not formed using historical data.

At block 210, while on patrol, the picking robot determines whether an item is detected. For example, while moving along the patrol route, the picking robot may constantly use its sensor(s) to detect a dropped item. Also, if autonomous, the picking robot may use the sensors to avoid stationary objects (e.g., shelves) and other robots as it moves along its assigned patrol route.

If no item is detected, the method 200 proceeds to block 215 where the picking robot determines whether an item has been reported by a sensor in the monitored area (e.g., a sensor integrated onto another robot or a stationary sensor). If not, the method 200 returns to block 205 where the robot continues along its patrol route.

However, if a dropped item was reported to the control system, the control system dispatches the picking robot to the location. In embodiments where there are multiple picking robots in the monitored area, the control system may identify which of the picking robots is closest to the location of the reported item, and dispatch that picking robot to the location.

At block 220, the picking robot moves to the location of the reported item. This can be done by the dispatcher telling the picking robot the location and then permitting the autonomous navigation system on the robot to move it to the location, or by providing a specific route the picking robot should use to get to the location. In another embodiment, the dispatcher may provide the location to a technician who then moves the picking robot to the location of the reported item.

At block 225, the picking robot picks the item from the floor or ground. This can be done autonomously by the robot or by a technician who is controlling the robot. Further, the robot can use any number of end effectors to retrieve the item such as a vacuum, scoop, grabber, electromagnet, etc. In one embodiment, the picking robot includes multiple types of end effectors. The picking robot can include a vision or other identifying system to determine physical characteristics of the item (e.g., flat, smooth, rigidity, weight, etc.). The picking robot (or a technician) can then select an end effector that best matches the physical characteristics of the item. For example, items with flat smooth surfaces may be best picked up with a vacuum end effector while soft items may be best retrieved using a grabber with multiple fingers.

At block 230, the picking robot determines whether the pick was successful. That is, whether the picking robot was able to retrieve the item and place it in a container on the robot. If so, the method 200 returns to block 205 where the picking robot can return to its patrol route to identify additional items. In one embodiment, the picking robot can continue to patrol until it either needs to recharge (in which case it returns to a charging station) or is dispatched to retrieve another reported item. Further, once its container is full, the picking robot may move to a designated location where the retrieved items are unloaded from its container, either automatically using mechanical means or by a technician. These items can then be re-stowed.

If, however, the picking robot was unable to retrieve the item at block 230, the method 200 instead proceeds to block 235 where the control system dispatches a technician to retrieve the item.

The method 200 may be used in a variety of different monitored areas to retrieve dropped items, whether those items are dropped by other robots or customers. The method 200 can also be used in monitored areas to control litter or clean up spills. In general, the method 200 leverages either stationary or mobile sensors to report dropped items (or dry or wet spills that should be cleaned up by a specialized picking robot) to a dispatcher which can then dispatch the picking (or cleaning) robot. While waiting to be dispatched, the picking robot can patrol the monitored area to identify dropped items on its own. Doing so may reduce the time a dropped item remains on the ground (which reduces the likelihood it will get damaged or cause damage to a robot) and also increase the likelihood that dropped items are detected.

Figure 3A:
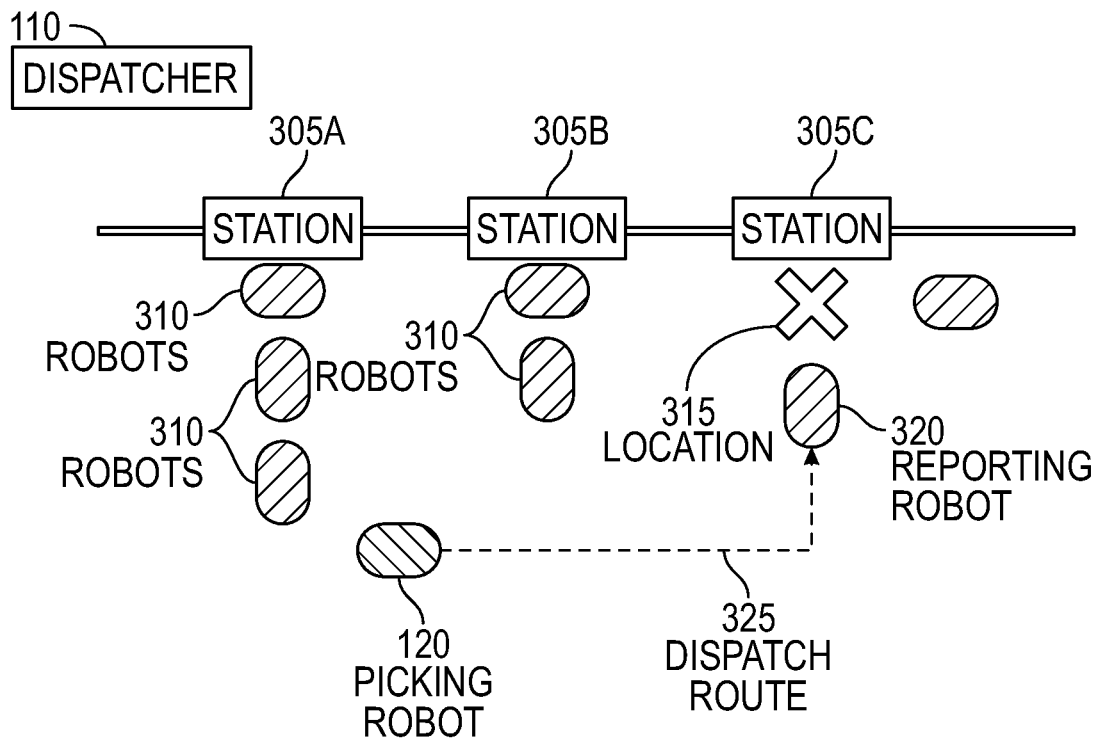
FIGS. 3A and 3B illustrate a picking robot responding to a location where a dropped item was detected, according to one embodiment described herein.
Figure 3B:
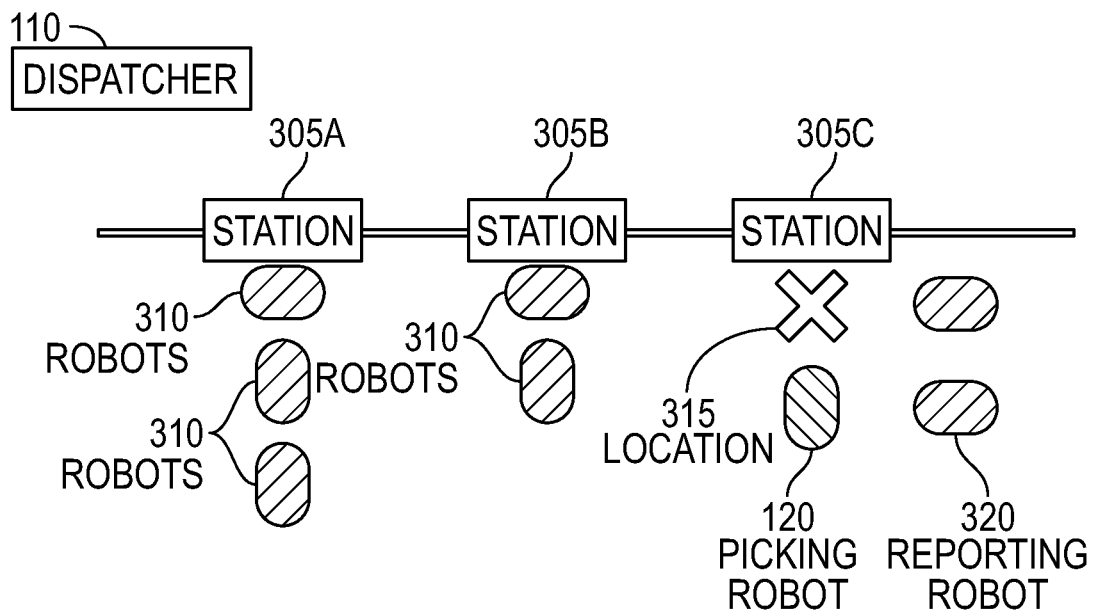

FIGS. 3A and 3B illustrate a picking robot responding to a location where a dropped item was detected, according to one embodiment described herein. In one embodiments, FIGS. 3A and 3B correspond to blocks of the method 200. For example, FIG. 3A illustrates the dispatcher 110 receiving from a reporting robot 320 a location 315 of a dropped item (e.g., block 215 of method 200). In response, the dispatcher 110 can instruct the picking robot 120 to move to the location 315 to retrieve the dropped item. However, FIGS. 3A and 3B illustrate only one example where sensors on the robots 310 and 320 are used to identify dropped items. In other embodiments, stationary sensors, or a combination of stationary sensors and sensors on robots, may be used to identify dropped items.

For example, the reporting robot 320 (as well as the robots 310) may be tasked with carrying items to and from the stations 305. These stations 305 may be manned by associates (or other robots) who pick one or more items carried by the robots 310, 320 in order to fulfill customer orders. Alternatively, the stations 305 may be used to place items onto the robots 310, 320, which in turn carry the items to a location in the warehouse where they are stowed.

As mentioned above, these interactions between the robots 310, 320 and the stations 305 can result in an item being dropped. Rather than requiring a technician to enter into the area (which may be a designated robot area) to retrieve the item, the dispatcher 110 can dispatch the picking robot 120 to retrieve the dropped item.

As shown, the picking robot 120 identifies a dispatch route 325 to move from its current location to the location 315 of the dropped item. Alternatively, the dispatcher 110 may provide the dispatch route 325 to the picking robot 120. Before being dispatched, the picking robot 120 may have been on patrol (as described at block 205 of the method 200) or idle (e.g., at a charging station or waiting at a standby location).

FIG. 3B illustrates the picking robot 120 arriving at the location 315. In this example, the dispatcher 110 has instructed the reporting robot 320 to move away from the location 315 to provide room for the picking robot 120 to approach the location 315 to retrieve the dropped item. After the picking robot 120 has retrieved the item and moved away from the location 315 (i.e., the pickup was successful), the dispatcher 110 can then inform the reporting robot 320 to approach the station 305C so that a pick/stow can be performed. That is, the dispatcher 110 can coordinate the actions of the picking robot 120 and the reporting robot 320 so the reporting robot 320 knows when it is safe to resume its normal operation.

Figure 4:
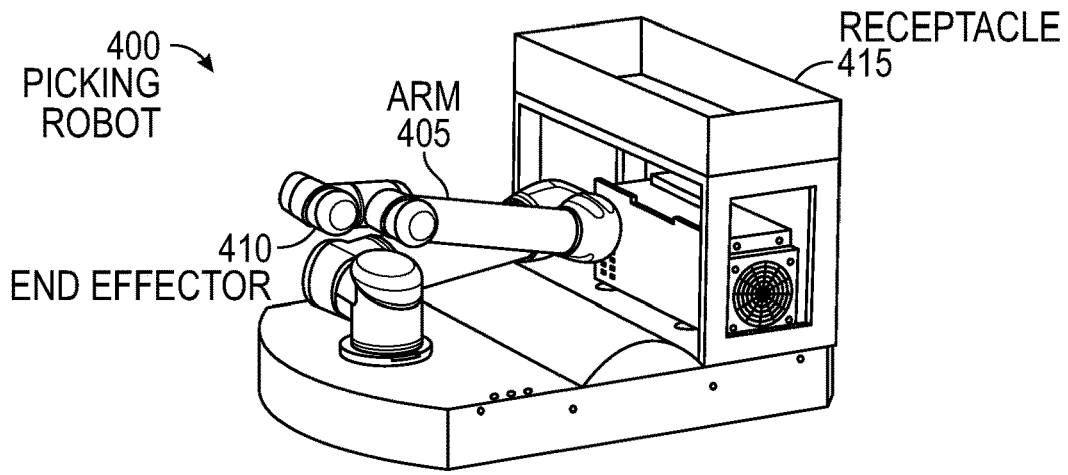
FIGS. 4, 5, and 6 illustrate different embodiments of a picking robot, according to one embodiment described herein.

FIG. 4 illustrates one example of a picking robot 400, according to one embodiment described herein. In this embodiment, the picking robot 400 includes an arm 405 where one end is connected to a base of the robot 400 and the opposite end is connected to an end effector 410. In one embodiment, the arm 405 has six-degrees of freedom (DOF) so that it can manipulate the end effector 410 to pick up items on multiple sides of the robot 400 as well as pick up an item on its top or side surfaces.

The end effector 410 can be implemented using a grasping element, a scoop, a vacuum element, and the like. If the end effector 410 is a grasping element, it can include two plates that the arm 405 can move so they are on opposite sides of the dropped item. By compressing the plates together, the end effector 410 can pick up the item. In another embodiment, the grasping element includes multiple fingers that can be disposed on different sides of the items and then moved together to retrieve the item.

The picking robot 400 includes a receptacle 415 in which the retrieved item is disposed and transported by the robot 400. That is, after the end effector 410 picks up an item, the arm 405 moves the end effector 410 over the receptacle 415 where the end effector 410 releases the item so it is stored in the receptacle 415. The receptacle 415 may be large enough to hold several items (of average size) so that the robot 400 can retrieve multiple dropped items before moving to a designated unload station where the items can be removed from the receptacle 415 by a technician or by mechanical/robotic means. The items may then be re-stowed or shelved, or if the items are damaged or are litter, they may be discarded.

Figure 5:
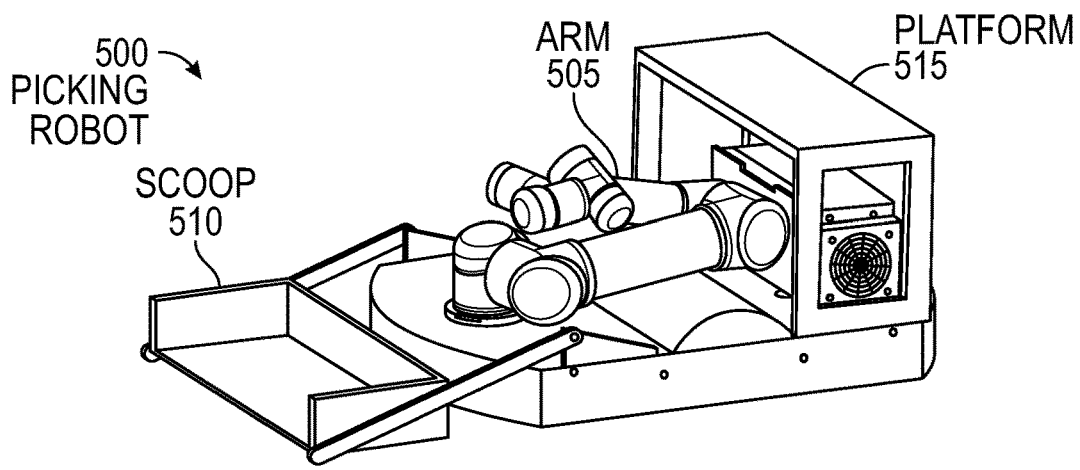

FIG. 5 illustrates one example of a picking robot 500, according to one embodiment described herein. The picking robot 500 includes an arm 505, which may be the same arm 405 as the one illustrated in FIG. 4. Although not labeled, the arm 505 may include an end effector which can be any of the types discussed above.

In addition to the arm 505, the robot 500 includes a scoop 510 for retrieving dropped items. For example, when approaching a dropped item, the robot 500 can use a vision system (not shown) to identify the item and determine its physical characteristics (e.g., whether it is flat or smooth, its rigidity or weight, etc.). The robot 500 can then determine whether to use the arm 505 or the scoop 510 to retrieve the item. If the robot 500 determines to use the scoop 510, it can maneuver itself so the scoop 510 is facing the item and then move towards the item until the item slides or rolls into the scoop 510. The robot 500 can then use actuators to lift the scoop 510 up and place the scoop 510 onto a platform 515. Doing so may reduce the likelihood the item will fall out of the scoop 510 when the robot 500 begins moving.

In one embodiment, the picking robot 500 can store multiple items in the scoop 510 (e.g., retrieve multiple dropped items) or store only one item in the scoop 510 at a time. That is, the picking robot 500 may be dispatched to pick up several items using the scoop 510 at different locations before returning to a designated area to return the items. Alternatively, because items already stored in the scoop 510 may slide or roll out of the scoop 510 when picking up additional items, the robot 500 may carry only one item in the scoop 510 at a time (or perform only one pick up action before returning the dropped items to the designated area).

In one embodiment, the scoop 510 and the arm 505 work together to retrieve dropped items. For example, the arm 505 may have an end effector that acts like a sweep or a blocking element to help slide or roll items into the scoop 510. When approaching a dropped item, before the scoop 510 makes contact with the item, the robot 500 can move the arm 505 so that the end effector is disposed on an opposite side of the item than the one facing the scoop 510. The end effector can then hold the item as the scoop 510 moves towards the item, thereby urging the item off the floor and into the scoop 510. Alternatively, the robot 500 may hold the scoop 510 stationary while the end effector pushes the item into the scoop 510. In this manner, the picking robot 500 can have multiple picking apparatuses that can either work independently, or together, to retrieve a dropped item.

In one embodiment, the scoop 510 is used like a plow to move dropped items along the floor. For example, the item may be too large to pick up with the scoop 510. Instead, the scoop 510 could push the dropped item out of a high traffic area into a low traffic area or to a designated clean up area.

Figure 6:
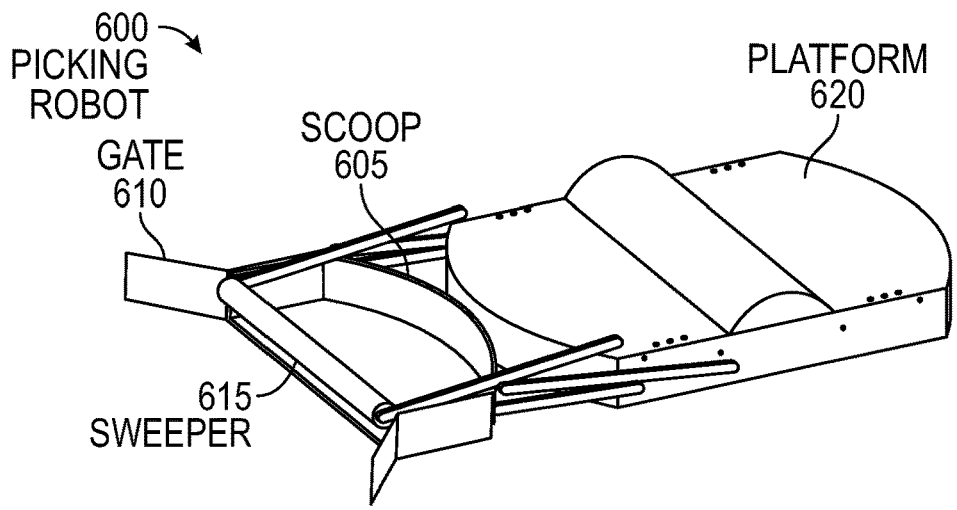

FIG. 6 illustrates one example of a picking robot 600, according to one embodiment described herein. The robot 600 includes a scoop 605 like the one illustrated in FIG. 5 that can be used to collect dropped items. In addition, the robot 600 includes gates 610 that can be opened when the robot 600 is in the process of retrieving a dropped item and closed when the item is retrieved. In FIG. 6, the gates 610 are opened to permit the scoop 605 to retrieve dropped items. Closing the gates 610 can help to retain retrieved items within the scoop 605. Thus, when the robot 600 is on patrol, is dispatched to pick up another dropped item, or traveling to the designated area to return the item, the gates 610 can be closed to reduce the likelihood a sudden acceleration will cause the retrieved item (or items) from falling out of the scoop 605.

The picking robot 600 also includes a sweeper 615 that can be used to pull items into the scoop 605. For example, after moving the robot 600 such that the scoop 605 is in front of the item, the robot 600 can extend the sweeper 615 up and over the item so that the sweeper 615 is now behind the item (relative to the scoop 605). The robot can then retract the sweeper 615 in a direction towards the scoop 605 to sweep or push the item into the scoop 605. The robot 600 can then close the gates 610 so they form a barrier that prevents the item from falling out of the front side of the scoop 605.

In addition, the robot 600 includes a platform 620 on which the robot 600 can place the scoop 605 when it is not actively retrieving a dropped item. Stated differently, after moving an item into the scoop 605, the robot 600 can close the gates 610 and then lift the scoop 605 to place it on the platform 620. This reduces the footprint of the robot 600 and also may reduce the likelihood the item will fall out of the scoop 605 as the robot moves to a different location.

Figure 7:
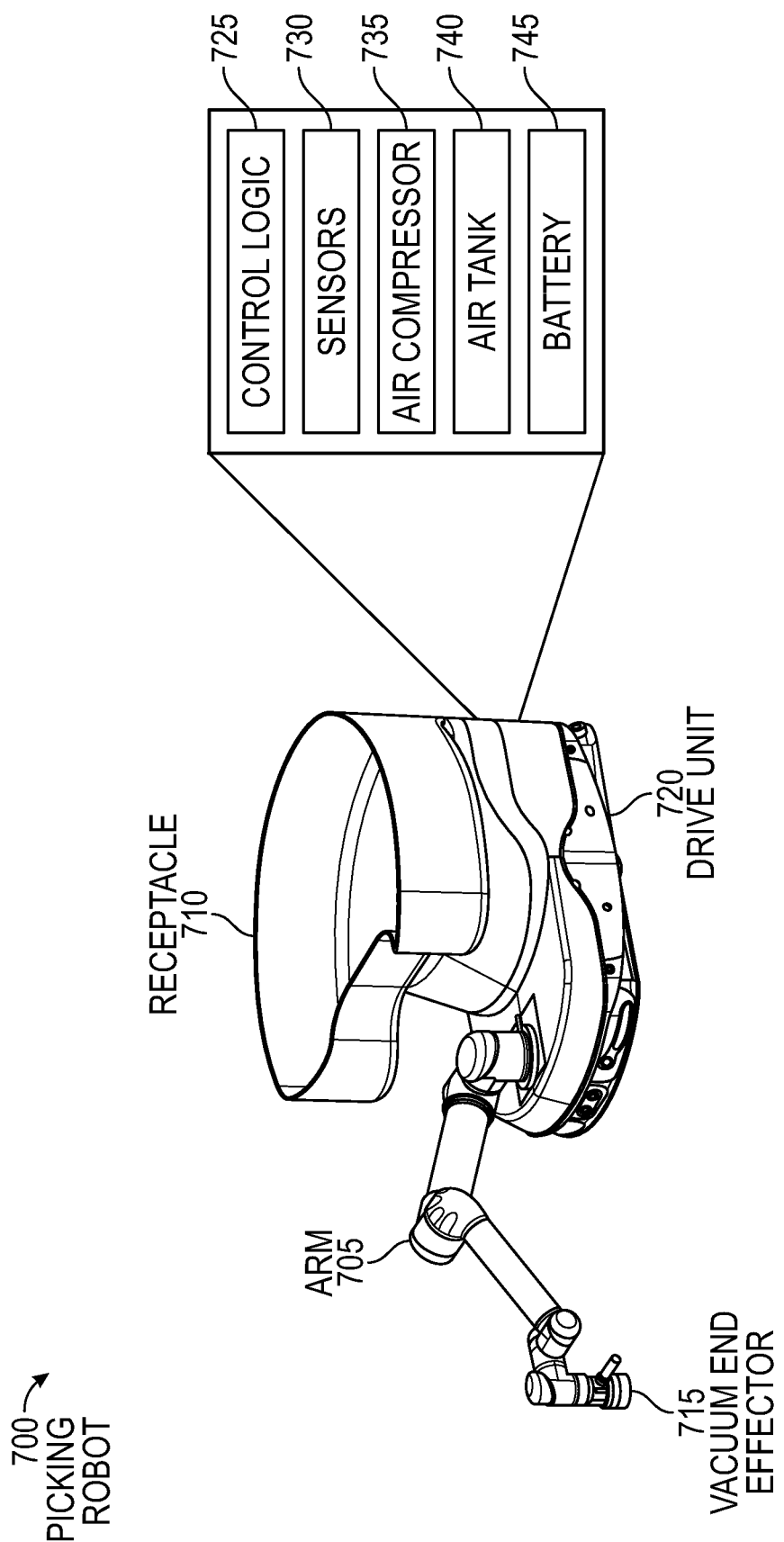
FIG. 7 illustrates a picking robot with a vacuum end effector, according to one embodiment described herein.

FIG. 7 illustrates a picking robot 700 with a vacuum end effector 715, according to one embodiment described herein.

The picking robot 700 also includes an arm 705 on which the vacuum end effector 715 is disposed. In one embodiment, the arm 705 has six-DOF movement so that it can manipulate the end effector 715 to pick up items that are on multiple sides of the robot 700 as well as pick up an item on its top or side surfaces. Generally, when the vacuum end effector 715 is placed in contact with the item, the robot 700 creates a vacuum seal which permits the arm 705 to pick up the dropped item.

The picking robot 700 includes a receptacle 710 for storing dropped items. After picking up an item, the arm 705 moves the vacuum end effector 715 to a position in or above the receptacle 710 where the vacuum seal is terminated so the item then drops into the receptacle 710. In one embodiment, the receptacle 710 can have a sufficient volume for holding multiple dropped items, although this will of course depend on the size of each individual item being retrieved. The robot 700 can track the size or volume of the retrieved items to determine when the receptacle 710 is full and the robot 700 should return to the designated area to unload the items in the receptacle 710 before retrieving other dropped items.

The picking robot 700 includes a drive unit 720 for maneuvering the robot 700 through the monitored area. The drive unit 720 can include multiple wheels, rollers, or tracks.

The picking robot 700 also includes several internal components such as control logic 725, sensors 730, an air compressor 735, an air tank 740, and battery 745. The control logic 725 can include various processors, memory, software applications, firmware, and hardware to perform the task described herein. For example, the control logic 725 may include a navigation application for maneuvering the robot 700 autonomously throughout the monitored area, a picking application for controlling the vacuum end effector 715 and arm 705 to retrieve dropped items, and communication application for communicating with the dispatcher and a technician if applicable.

The sensors 730 can be used to provide environmental sensor data to enable the control logic 725 to maneuver the robot 700 through the monitored area. Further, the data generated by the sensors 730 can be used to identify dropped items when, e.g., the robot 700 is patrolling as well as determine how to move the arm 705 and control the end effector 715 in order to retrieve a dropped item. The sensor data can also be used to prevent collisions between the robot 700 and structures, humans, and other robots that may be in the monitored area.

In this embodiment, the robot 700 relies on compressed air generated by the air compressor 735 and stored in the air tank 740 to create a vacuum to enable the end effector 715 to pick up dropped items. As the compressed air flows through the end effector 715, it creates a vacuum that is used to retrieve the dropped item. While a vacuum end effector 715 is suitable to pick up a large variety of different items with different weights, it also requires more power from the battery 745 to power the air compressor 735 than other types of end effectors such as grasping end effectors. That is, providing a mobile, battery operated robot like the picking robot 700 presents difficult engineering challenges for providing sufficient power to operating the air compressor 735 and the vacuum end effector 715 while minimizing the weight and maximizing the amount of time the robot 700 can operate before having to recharge at a charging station. For example, while adding a larger battery 745 provides more power (e.g., greater amperage), it also increases cost and the weight of the robot 700. Adding weight has a negative effect on the amount of time the robot 700 can operated without recharging. Using a smaller battery 745 may reduce weight and cost, but it may mean that there is reduced power to operate all the functions of the robot 700, e.g., navigation, movement, communication, picking, etc.

Figure 8:
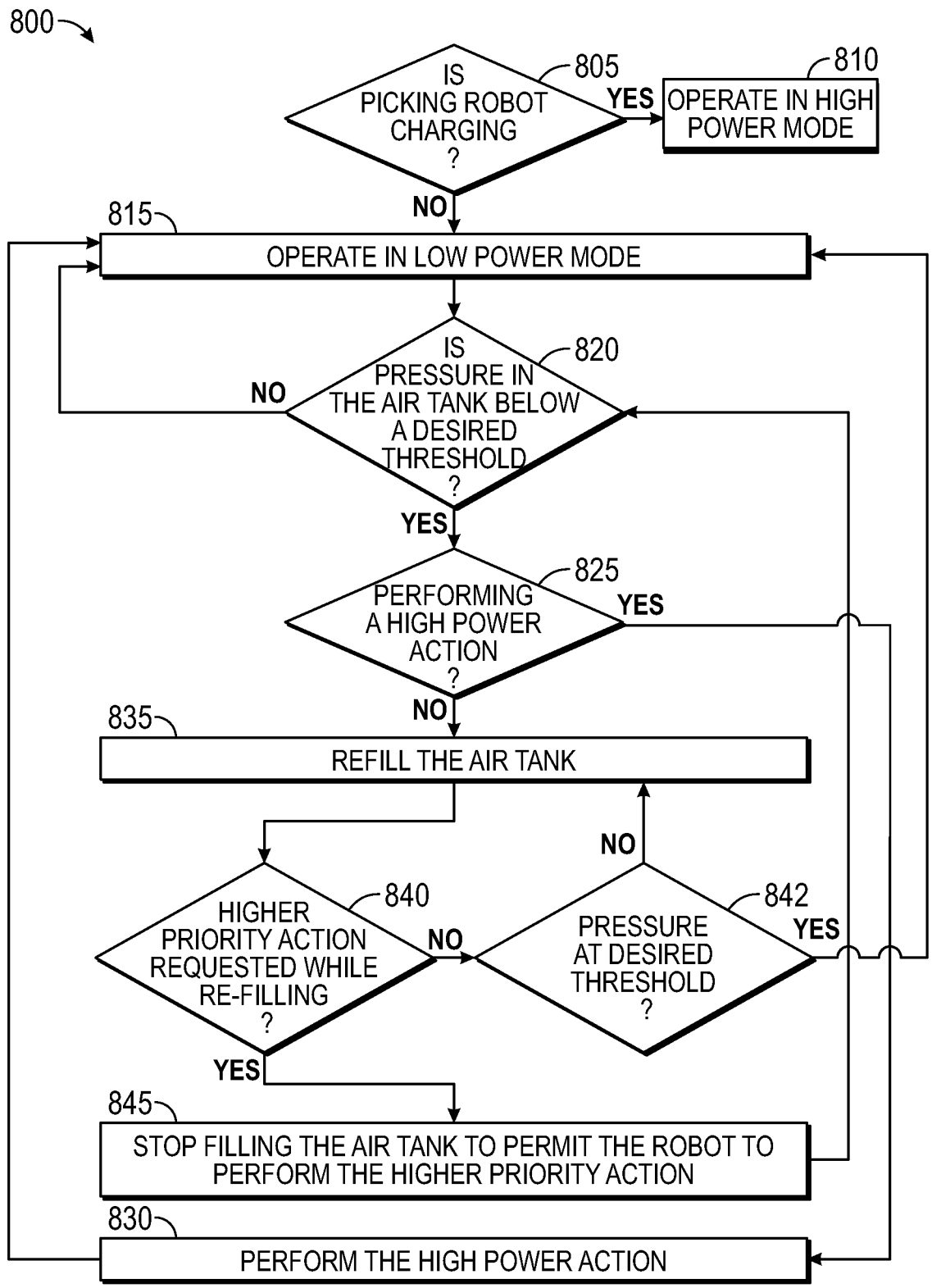
FIG. 8 is a flowchart for operating a picking robot with a vacuum end effector in a low power mode, according to one embodiment described herein.

FIG. 8 is a flowchart of a method 800 for operating a picking robot with a vacuum end effector in a low power mode, according to one embodiment described herein. In one embodiment, the method 800 can be used with a lower power battery which permits the picking robot (e.g., the robot 700) to still perform its functions without exceeding the amperage ratings of the battery. In one embodiment, the battery does not have sufficient capacity to power all the functions of the robot at the same time. For example, the battery may be unable to provide sufficient current so that the robot can operate the air compressor at the same time it operates its drive unit, or at the same time it operates the arm to pick up a dropped item.

At block 805, the control logic determines whether the picking robot is currently charging. For example, the picking robot may currently be docked at a charging station to charge its battery. This means that the picking robot can rely on auxiliary power provided by the charging station.

If the robot is currently at a charging station, then the method 800 proceeds to block 810 where the control logic operates the picking robot in a high power mode. In this mode, there may not be any restrictions on which functions can be performed with other functions. That is, because the robot can rely on the power provided by the charging station, it can operate any of the functions it likes in the high power mode.

However, if the robot is not at the charging station and is relying solely on the power provided by its internal battery, the method 800 proceeds to block 815 where the robot operates in a low power mode. In this mode (as explained below), there are restrictions on what functions can operate in parallel with other functions so as to not exceed the current restrictions of the battery. Put differently, in the low power mode, the control logic may prevent two high-power functions from operating at the same time. In method 800, it is assumed that air compressor cannot operate at the same time as another high power action such as using the drive unit to move the robot in the environment or using the arm to lift an item that weighs more than a threshold.

At block 820, the control logic determines whether the pressure in the air tank is below a desired threshold. For instance, the threshold may be set to maintain enough pressure in the air tank to perform, on average, three pick up operations without having to activate the air compressor. If the pressure is at or above this threshold, the method 800 returns to block 815 where the robot can continue to perform its normal function such as patrolling a route, being dispatched to a location with a dropped item, and retrieving the dropped items.

However, once the pressure falls below the threshold, at block 825 the control logic determines whether the robot is currently performing a high power action. For example, the robot may currently be moving in the environment using its drive unit or lifting an object with the arm and vacuum end effector. If the robot is already performing a high power action, the method proceeds to method 830 where the control logic keeps performing the action. That is, the control logic permits the high power action to continue without interruption. However, in another embodiment, if the pressure continues to fall below a second, lower threshold, the control logic may stop the current high power action (e.g., instruct the drive unit to stop moving the robot, or stop the lifting action) so that the air tank can be refilled.

Assuming the robot is not performing a high power action at block 825, the method proceeds to block 835 wherein the control logic instructs the air compressor to refill the air tank. While refilling the air tank, at block 840 the control logic determines whether a higher priority action is requested. For example, while refilling the tank, the robot may have received a request to pick up a dropped item from the dispatcher, which may be a higher priority action than refilling the tank. If so, the method 800 proceeds to block 845 where the control logic stops filing the air tank so that the robot can perform the higher priority action.

In one embodiment, the control logic may stop refilling the tank only if the higher priority action cannot be performed at the same time as refilling the tank without exceeding the capabilities of the battery. That is, if the battery has sufficient power for performing both functions, then the control logic can permit both actions to occur in parallel. For example, the battery may be able to power both the air compressor and the drive unit, but cannot power both the air compressor and the arm. In that case, assuming that moving the arm is a higher priority action, the control logic disables the air compressor so that the arm can receive sufficient power from the battery.

If the control logic prematurely stopped refilling the tank in order to perform the higher priority action, then the method 800 returns to block 820 where the control logic can determine whether the pressure threshold has been met, and if not, continue to look for an opportunity to operate the air compressor to refill the air tank. Thus, in this manner, the low power mode can opportunistically operate the air compressor when the robot is not performing other high power actions. Doing so enables the use of a less expensive and lighter battery that can help the stability and increase the operational cycle of the picking robot.

Returning to block 840, if there is no higher priority action requested, then the method 800 proceeds to block 842 where the control logic determines whether the pressure in the tank has reached the desired threshold. If so, the control logic can turn off the air compressor and the method 800 returns to block 815. If no, the method 800 returns to block 835 where the control logic continues to refill the tank while monitoring to determine whether a higher priority action is requested.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
moving items in a warehouse using a fleet of first robots, wherein each robot of the first robots includes one or more sensors to detect items dropped by one or more robots of the first robots;
patrolling the warehouse using a picking robot that is separate from the fleet of the first robots to search for the items dropped by one of the first robots;
detecting a dropped item using at least one sensor of at least one robot of the first robots;
receiving, at the picking robot and while the picking robot is patrolling the warehouse, a dispatch from the at least one robot of the first robots to retrieve the dropped item;
moving the picking robot to a location of the dropped item; and
placing the dropped item into a receptacle on the picking robot.

2. The method of claim 1, further comprising:
after placing the dropped item into the receptacle, again patrolling the warehouse using the picking robot.

3. The method of claim 1, further comprising:
detecting, while patrolling the warehouse, a second dropped item using a sensor on the picking robot; and
placing the second dropped item into the receptacle on the picking robot.

4. The method of claim 1, further comprising, before receiving the dispatch at the picking robot:
reporting the dropped item to a central control system, wherein the dispatch to the picking robot is sent from the central control system.

5. The method of claim 1, wherein the picking robot comprises a vacuum end effector disposed on an arm, wherein placing the dropped item into the receptacle on the picking robot comprises:
lifting the dropped item using the vacuum end effector;
moving the dropped item over the receptacle using the arm; and
placing the dropped item into the receptacle.

6. A method comprising:
patrolling a designated area using a picking robot to search for dropped items dropped by one or more of a plurality of moveable robots that are separate from the picking robot, wherein each moveable robot of plurality of moveable robots includes one or more sensors to detect items dropped by one or more moveable robots of the plurality of moveable robots;
detecting a dropped item using at least one sensor of at least one moveable robot of the plurality of moveable robots;
receiving, at the picking robot and while the picking robot is patrolling the designated area, a dispatch from the at least one moveable robot of the plurality of moveable robots to retrieve the dropped item;
moving the picking robot to a location of the dropped item; and
placing the dropped item into a receptacle on the picking robot.

7. The method of claim 6, further comprising:
generating a patrol route for the picking robot based on historical data of previously dropped items, indicating first regions in the designated area where items are more likely to be dropped relative to second regions in the designated area.

8. The method of claim 6, wherein the one or more sensors are communicatively coupled to a central control system, wherein the dispatch to the picking robot is sent from the central control system.

9. The method of claim 6, wherein the picking robot is an autonomous robot that navigates through the designated area and places the dropped item into the receptacle without human intervention.

10. The method of claim 6, wherein the picking robot comprises a vacuum end effector disposed on an arm, wherein placing the dropped item into the receptacle on the picking robot comprises:
lifting the dropped item using the vacuum end effector;
moving the dropped item over the receptacle using the arm; and
placing the dropped item into the receptacle.

11. The method of claim 6, further comprising:
identifying a second dropped item in the designated area;
determining that the picking robot was unable to place the second dropped item in the receptacle; and
dispatching a technician to retrieve the second dropped item.

12. The method of claim 6, further comprising stationary sensors distributed throughout the designated area.

13. A picking robot, comprising:
a drive unit for moving the picking robot through an environment;
a receptacle;
one or more processors; and
one or more computer-readable media storing computer-executable instructions that, when executed, cause the one or more processors to perform acts comprising:
causing, using the drive unit, the picking robot to move to a designated area in the environment, wherein the designated area includes a plurality of sensors mounted on moveable robots that are separate from the picking robot, and wherein at least one sensor of at least one moveable robot of the moveable robots detects a dropped item dropped by one or more moveable robots of the moveable robots in the designated area;
receiving, at the picking robot while patrolling the designated area, dispatch data from the at least one moveable robot of the moveable robots requesting the picking robot to retrieve the dropped item;
causing, using the drive unit, the picking robot to move to a location of the dropped item; and
causing the picking robot to place the dropped item into the receptacle.

14. The picking robot of claim 13, the acts further comprising:
generating a patrol route for the picking robot based on historical data of previously dropped items, the patrol route indicating first regions in the designated area where items are more likely to be dropped relative to second regions in the designated area.

15. The picking robot of claim 13, wherein the plurality of sensors are communicatively coupled to a central control system, wherein the dispatch data is sent from the central control system.

16. The picking robot of claim 13, wherein the picking robot is an autonomous robot that navigates through the designated area and places the item into the receptacle without human intervention.

17. The picking robot of claim 13, further comprising a vacuum end effector disposed on an arm, wherein causing the picking robot to place the item into the receptacle comprises:
    lifting the item using the vacuum end effector;
    moving the item over the receptacle using the arm; and
    placing the item into the receptacle.

18. The picking robot of claim 13, wherein the dispatch data comprises first dispatch data, and the acts further comprising:
    identifying a second item that has been dropped in the designated area;
    determining that the picking robot was unable to place the second item in the receptacle; and
    sending second dispatch data requesting that a technician retrieve the second item.

19. The picking robot of claim 13, wherein the plurality of sensors further includes stationary sensors distributed throughout the designated area.

20. The picking robot of claim 13, wherein a central control system transmits data representing an instruction instructing the at least one moveable robot of the moveable robots to move away from the dropped item to provide room for the picking robot to approach the dropped item.

\* \* \* \* \*